July 29, 1952     F. L. DAVIS     2,605,064
CARGO SECURING SYSTEM
Filed July 10, 1947     7 Sheets-Sheet 1

INVENTOR.
FRANK L. DAVIS
BY
*Philip S. McLean*
ATTORNEY

July 29, 1952 F. L. DAVIS 2,605,064
CARGO SECURING SYSTEM
Filed July 10, 1947 7 Sheets-Sheet 2

INVENTOR.
FRANK L. DAVIS
BY
ATTORNEY

July 29, 1952 — F. L. DAVIS — 2,605,064
CARGO SECURING SYSTEM
Filed July 10, 1947 — 7 Sheets-Sheet 4

INVENTOR.
FRANK L. DAVIS
BY
ATTORNEY

July 29, 1952

F. L. DAVIS 2,605,064

CARGO SECURING SYSTEM

Filed July 10, 1947

INVENTOR.
FRANK L. DAVIS
BY
ATTORNEY

July 29, 1952  F. L. DAVIS  2,605,064
CARGO SECURING SYSTEM
Filed July 10, 1947  7 Sheets—Sheet 6

INVENTOR.
FRANK L. DAVIS
ATTORNEY

Patented July 29, 1952

2,605,064

UNITED STATES PATENT OFFICE 2,605,064

CARGO SECURING SYSTEM

Frank L. Davis, College Point, N. Y.

Application July 10, 1947, Serial No. 760,173

5 Claims. (Cl. 244—118)

The invention herein disclosed relates to the securing, separation and general disposition of cargo in aircraft and other forms of transports.

Objects of the invention are to provide cargo holding, placing and retaining means which will be adaptable to a great variety of conditions, which can be readily installed and used in various combinations to meet different conditions and which will be reliable and safe in all respects.

More specific objects of the invention are to provide readily installed units which may be combined in various ways to brace and hold cargo against all strains to which a load may be subjected and to enable separation and assortment of cargo in special groups such as in bins and compartments of various sizes, relations and arrangements.

Further special objects of the invention are to provide units for such purposes, simple in structure, strong and durable and which may be readily combined and adjusted to serve particular requirements.

Other special objects of the invention are to provide the fundamentals of a system such as outlined which may be incorporated with or in the structure of the transporting vehicle and serve useful, strengthening and other functions in that relation, without obstructing or in any way interfering with the normal uses and operation of such a vehicle.

Particular objects of the invention also are to provide a securing and holding system of reasonable cost and light weight and which can be incorporated in the transport vehicle at the time of building or later, according to particular circumstances.

Other desirable objects and the novel features through which the purposes of the invention are attained are set forth or will appear in the course of the following specification.

The drawings accompanying and forming part of the specification illustrate certain presently used forms of the invention but it will be apparent that structure and arrangement may be modified and changed in wide limits, all within the true intent and broad scope of the invention as hereinafter defined and claimed.

Fig. 5 is a broken longitudinal sectional view illustrating installation of a longitudinal partition, barrier or the like;

Fig. 6 is a broken part sectional view illustrating use of the system to form a carrier for litters or the like;

Fig. 7 is a broken partial plan view illustrating the hanging of the litter in the hold-down straps secured between floor and ceiling tracks or rails, this view appearing as on substantially the plane of line 7—7 of Fig. 6;

Fig. 8 is an enlarged broken sectional detail on substantially the plane of line 8—8 of Fig. 6, showing how the track engaging rings may be utilized to form loops in the hold-down straps for supporting the stretcher handles;

Fig. 9 is a broken cross sectional detail of the track structure, showing a circular form of slide ring, the parts appearing as on substantially the plane of line 9—9 of Fig. 6;

Fig. 10 is a broken side elevation with dotted lines indicating how a slide ring may be passed down through notches and caught beneath the outstanding side flanges of a skid rail;

Figs. 11 and 12 are broken cross sectional and side views similar to Figs. 9 and 10, showing how the pull of a hook at an angle serves to lock a slide ring in position on a skid rail;

Fig. 13 is a broken cross sectional view showing one of the wide loop strap holding form of slide rings engaged on a skid rail;

Figs. 14 and 15 are broken side and top plan views illustrating adaptation of a special hook for anchoring a slide ring in definite position on a skid rail;

Figs. 16 and 17 are broken perspective views of different forms of rails or tracks;

Fig. 18 is a perspective view illustrating use of stakes or posts on the rails for holding a load on a truck, van, railroad car or the like;

Figure 1:
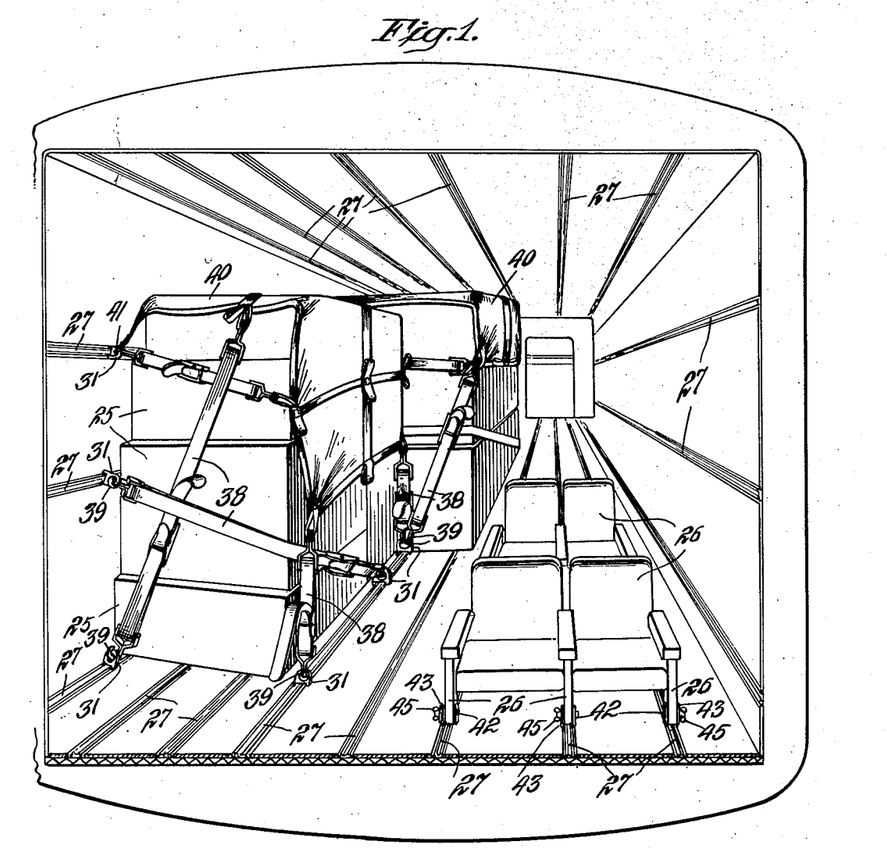
Fig. 1 in the drawings is a broken cross sectional and perspective view showing portions of the equipment in a combined cargo and passenger transport aircraft.

In Fig. 1 the invention is shown applied to the securing of cargo and passenger seats in a transport airplane, the boxes and containers 25 representing the cargo, being secured along one side and the seats 26 along the opposite side of the carrier compartment.

For effecting such results the vehicle is equipped with skid rails or tracks 27 and, in a typical installation, these tracks are set in the floor, the side walls and roof or ceiling of the vehicle. Usually they are spaced at equal distances apart but the spacing may be varied to meet any special requirements. Also, while shown running longitudinally of the ship, they may be run transversely or in various angular relations, curves or such combinations as will meet particular requirements. These rails may be sunk substantially flush in the floor, walls or ceiling, or they may project. They may, for one example, be flush in the floor and exposed in other positions.

A feature of the tracks described is that they have skid surfaces 28 at the top or exposed face and side flanges 29 set back from the skid face.

In a typical installation for aircraft, these tracks are made of magnesium extruded in channel or U-shape form with the skid rail surfaces formed by the upstanding edge portions of the channel and the set back flanges projecting from the sides of the channel. This provides lightness with strength and affords a center space to accommodate fastenings 30 by which the channels are secured to the vehicle framing or other structure.

Associated with the tracks are various forms of slide rings and the like which can be hooked over the side flanges 29 and adjusted as needed to various positions on the tracks.

Figures 11, 12, 13, 14, 15, 16, 17, 18:
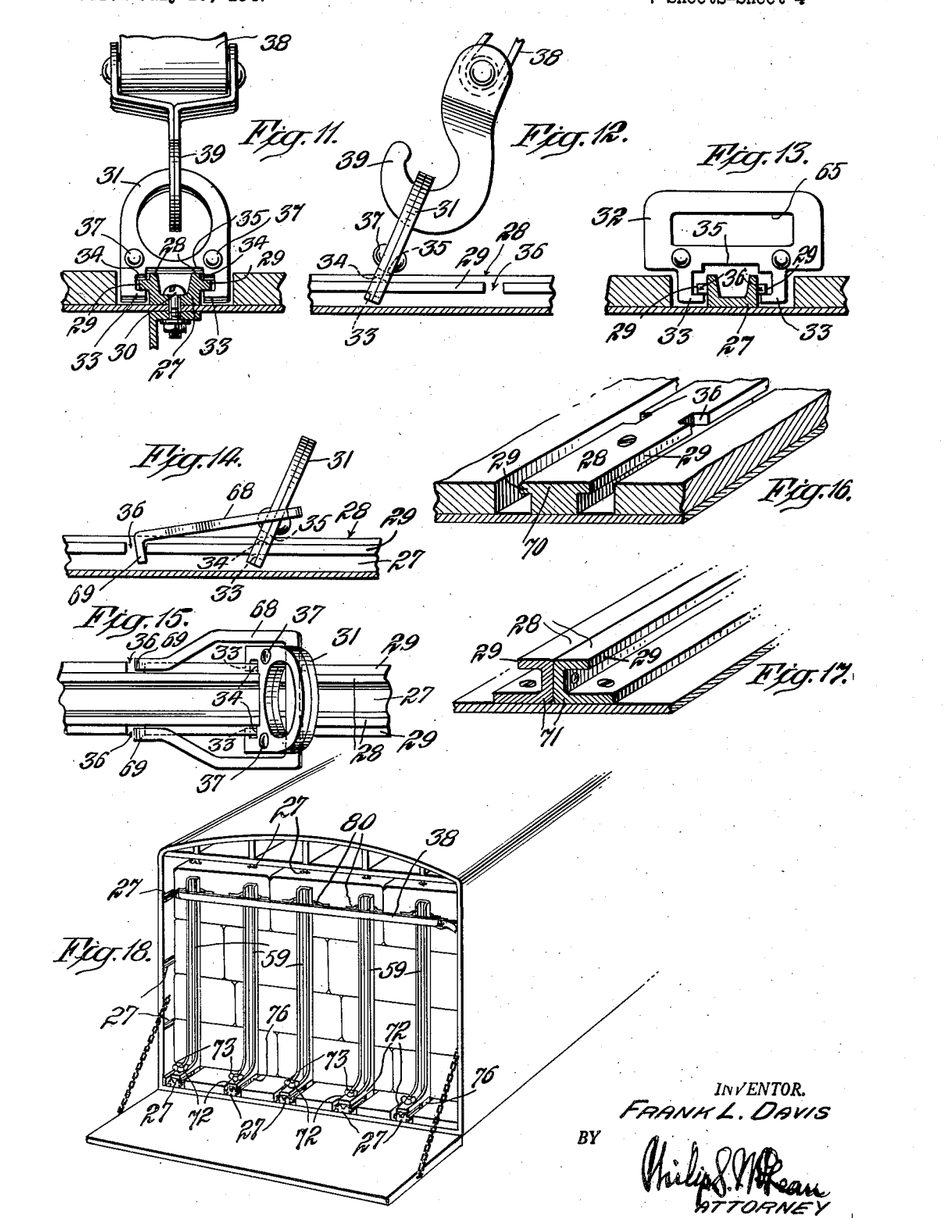
Figure 19:
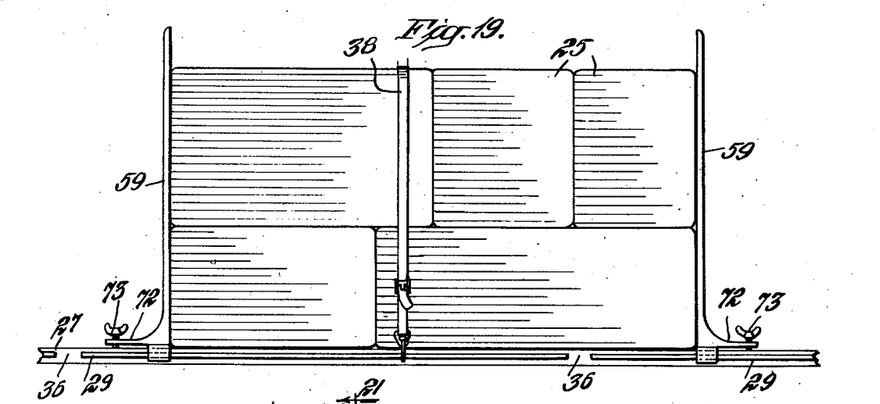
Fig. 19 is a broken side view showing the load as confined between opposing stakes, secured in adjusted relation on the rails.

For cargo hold-down purposes circular hook receiving rings such as shown at 31, Fig. 11, may be used, or flat, lower and wider loop rings to receive straps such as shown at 32 in Fig. 13.

In both forms the rings 31 or 32 have companion opposed jaws 33 to engage beneath the side flanges 29 of the rails.

Also, generally, as shown in Figs. 11 and 12, the slide rings will have surfaces 34 opposed to the jaw portions 33 to slidingly engage the tops of the side flanges 29 and an intermediate connecting edge portion 35 to ride the track surfaces 28.

As particularly shown in Fig. 12, the spacing of the flange riding surfaces 34 and the track riding surface 35 from the jaws 33, is preferably such as to cause these edges to bind on top of the side flanges and on the track surfaces when the rings are canted over at an angle, thus to lock them under an applied load in firmly held position on the rails.

To enable the rings to be hooked beneath the side flanges, the latter are shown as having interruptions or gaps 36 at selected intervals, usually of a width just sufficient to admit the rings in substantially upright or perpendicular position.

The rings may be produced inexpensively in light, strong form by stamping them out of sheet metal and then securing two or more of such stampings together as by riveting or otherwise, as indicated at 37.

Depending on its nature, the cargo may be held by straps or blankets equipped with special take-up devices, as disclosed in copending patent applications Serial No. 587,340, filed April 9, 1945, now U. S. Patent No. 2,442,266, and Serial No. 706,316, filed October 29, 1946, now U. S. Patent No. 2,542,499.

In Fig. 1 adjustable take-up straps are shown at 38 having end hooks 39 caught to slide rings 31 engaged with skid rails 27 on the floor and side wall of the carrier, and blankets 40 are shown secured over the load by having hooks 41 at the edges of the same caught to slide rings 31 and pulled tight by take-up straps 38 caught to other slide rings. As many blankets and as many take-up straps may be employed as the bulk, weight and formation of the load may require, and these straps may be crisscrossed, angled and extended in various directions and caught to rings on the tracks which will afford the best anchorage.

Different forms of rail engaging slide rings, hooks or clamps may be used, according to the objects to be held.

Figure 2:
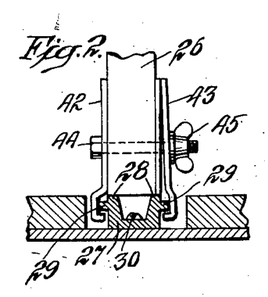
Fig. 2 is a broken part sectional detail of one of the adjustable hold-down clamps for removably and adjustably securing passenger seats or the like down on the skid rails of such an aircraft.
Figure 3:
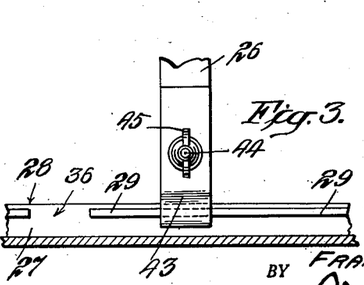
Fig. 3 is a broken side elevation of the same parts.

Thus in the case of the passenger seats shown at 26 in Fig. 1, jaws are provided which will clamp the legs or frames of the seats or chairs down on the floor rails. These clamps are shown in Figs. 2 and 3 as comprising downwardly reaching, opposed jaw levers 42, 43, drawn together at the opposite sides of the chair legs by through bolts 44 and wing nuts 45. These jaws reach down, around and under the side flanges 29 of the rails and are so designed that with tightening of the nuts 45 they will pull the chair legs downwardly into firmly seated engagement on the skid track surfaces 28. On loosening these bolt fastenings the chairs can be shifted to any desired positions on the rails and secured at such locations by simply tightening the fastenings. Complete removal may be effected by sliding the seats to positions where the clamps will pass through the gaps 36, Fig. 3, in the side flanges, or by taking out the bolts so as to release the clamp plates.

Figure 4:
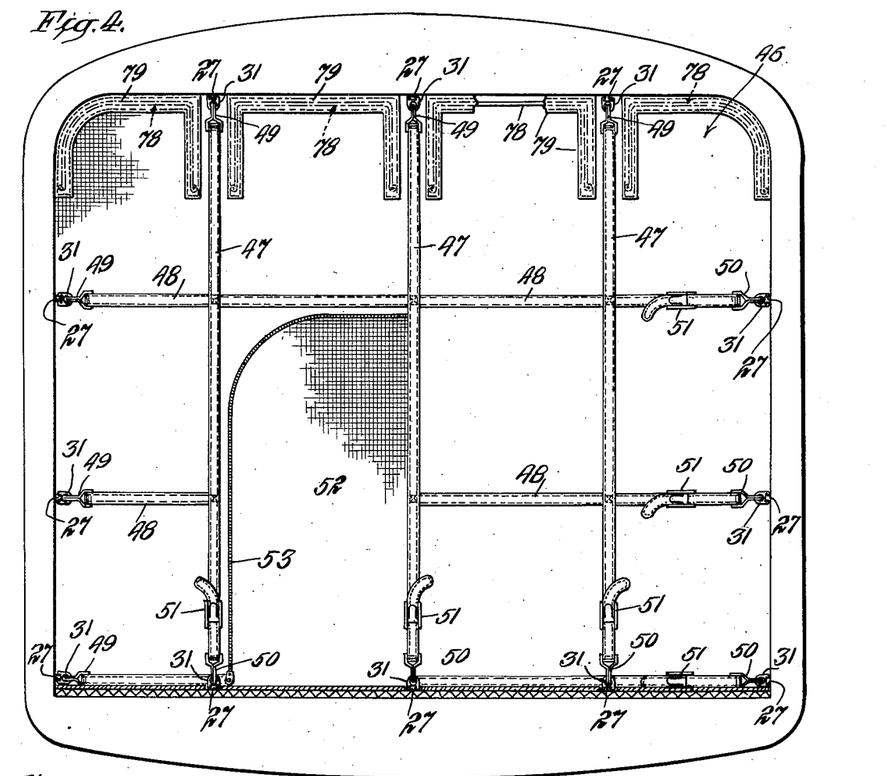
Fig. 4 is a cross sectional view similar to Fig. 1, illustrating installation of a transverse partition utilizing the same skid rails on the floor, walls and ceiling of such a transport plane.

Partitions for dividing the carrier into different cargo compartments can be quickly set up as shown in Fig. 4, by providing a flexible curtain wall 46 of fabric or the like sufficiently strong for the purpose and sustained by crossed vertical and horizontal straps 47, 48, having hooks 49 at one end to engage slide rings 31 on the roof rails and on the rails at one side of the ship and having hooks 50 at the opposite ends engageable with slide rings on the floor rails and on the rails at the other side of the cargo compartment. At the latter ends the vertical and horizontal straps are shown as having take-up buckles 51 similar to those disclosed in the companion application Serial No. 587,340, enabling the curtain partition to be tight and secure as required.

The cross partition 46 is shown as having a door section 52 between two of the vertical tensioning straps, which may be opened or closed by a slide fastener indicated at 53.

To make the partition a substantially tight fitting wall, the material may be cut to fit the particular cross section of the cargo compartment and the edges of the partition be thrust into form fitting engagement with the surrounding wall by appropriately shaped arched springs 78 held in pockets 79 in the correspondingly contoured edge portions of the partition fabric.

The partition walls may be set up longitudinally and in various angular relations.

Figure 5:
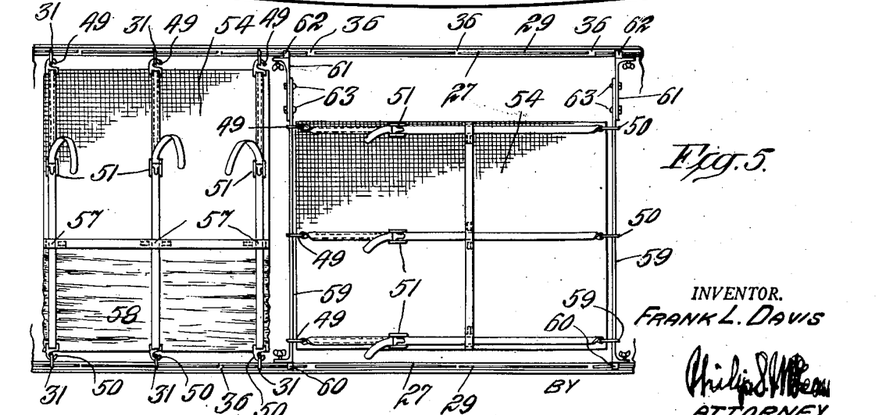

For example, as shown in Fig. 5, a curtain or blanket 54 may be extended longitudinally of the ship, caught to roof ring slides at the top by hooks 49 and tensioned to the floor slide rings by hooks 50 and take-up buckles 51.

For adjustable take-up purposes, the end portions of the straps to which the buckle bodies are secured, as represented at 55, may be stitched or otherwise secured to the blanket and the opposite end portions, represented at 56, be attached only at the far edge portion of the blanket where the hooks 49 are located, being free except for sliding through cross guide loops 57 so that with tightening, any surplus portion of the blanket will be free to gather substantially as represented at 58. Thus the edge portions of the blanket will be held taut with portions in between free to fold or gather if there be excess material in the blanket as thus connected. Fig. 5 shows at the right how a blanket or blankets may be rigged to form an open top wall or bin by stretching it between spaced upright posts or stakes 59 having hooked lower ends 60 caught over the floor rails and braced at their upper ends by extension bars 61 hooked at 62 over ceiling rails and adjustably secured to the tops of the stakes by slot and bolt fastenings at 63.

Figures 6, 7, 8, 9, 10:
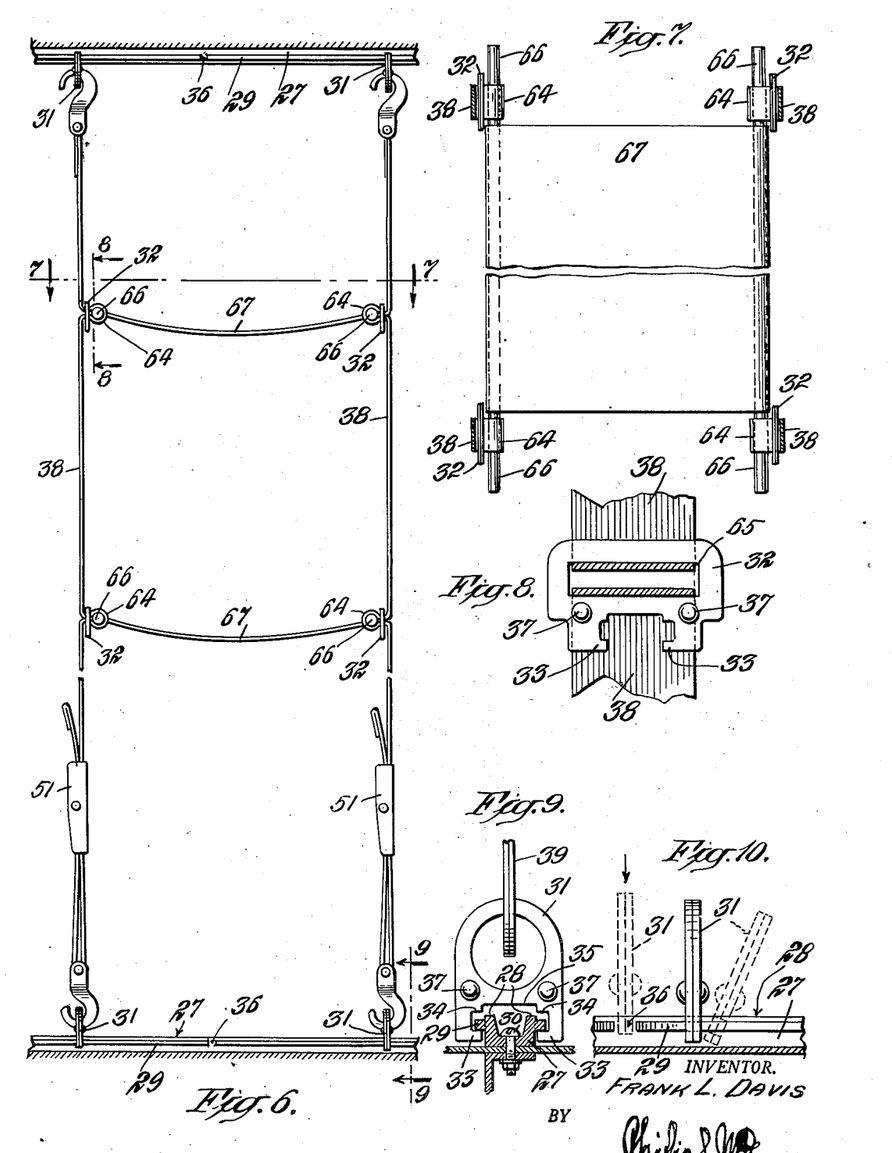

For carrying litters or suspending other like objects, the arrangement shown in Figs. 6, 7 and 8 may be employed, embodying take-up straps 38 hooked at the top and bottom to ceiling and floor slides 31 and tightened by the take-up buckles 51 after having looped portions 64 of the same passed through the wide strap loop openings 65 of the flat slides 32 and caught about the handles or hand grips 66 of the litters 67.

By proper adjustment of the strap loops 64 and the confining rings 32, stretchers or like objects may be supported, one above the other, between two pairs of take-up straps at any desired height from the floor and in different horizontal or inclined relations.

Litters for injured or the like, may thus be quickly installed in any desired locations and elevations and this manner of carrying litters cushions and insulates the occupants from vibration and shock.

If desired, the slide rings may be positively locked in position on the rails as by slipping anchorage hooks 68 over and about the same, as in Figs. 14 and 15, these hooks having tangs such as indicated at 69 to enter and interlock in the notches 36 in the side flanges of the rails.

While the extruded channel form of track is generally preferred, it is contemplated that the tracks may be formed in general T-shape, as indicated at 70 in Fig. 16, or be formed of two channels 71, Fig. 17, riveted or otherwise secured together in back-to-back relation to provide in each case the skid rail surfaces 28 on top and the retaining flanges 29 at the sides.

The holding or partitioning posts or stakes 59 may be constructed as shown in detail in Figs. 19 to 23, with angularly outstanding feet or braces 72 at the bottom carrying clamp screws 73 which can be turned down against underlying surfaces to rock the posts into holding position and to secure them in adjusted relation on the tracks. As shown particularly in Figs. 20 and 23, these clamping screws may carry each a swiveled gripping pad 74 at the end to afford extended surface holding engagement with the underlying structure.

Figures 20, 21, 22, 23:
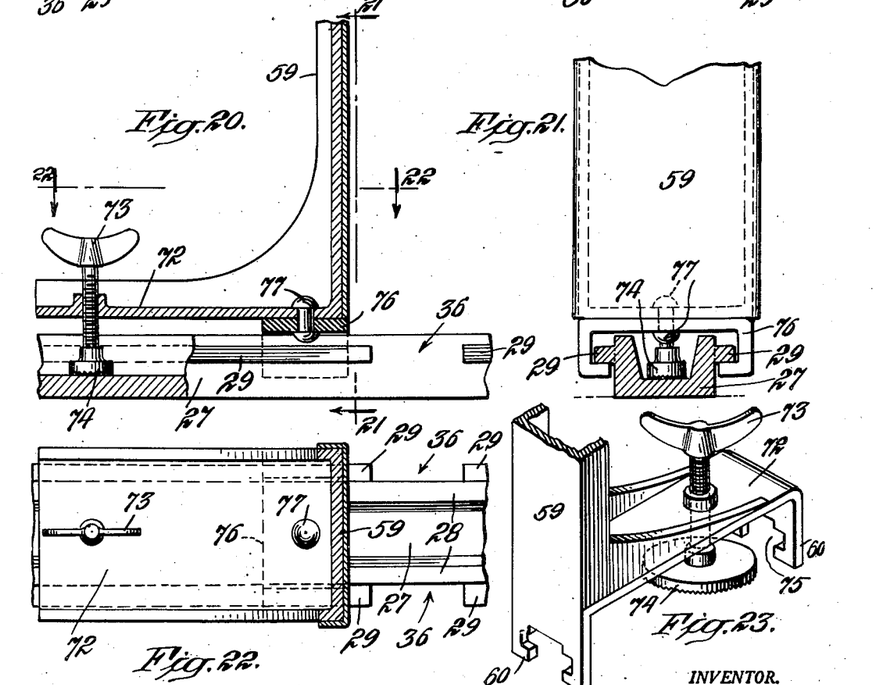
Figs. 20, 21 and 22 are broken vertical and horizontal section views of the stake and rail construction, Fig. 21 appearing as on the line 21—21 of Fig. 20 and Fig. 22, the parts appearing as on the plane of line 22—22 of Fig. 20.
Fig. 23 is a broken perspective view of the bracing, clamping and securing foot portion of one of the slidingly mounted stakes.

To combine lightness with strength, the posts 59 may be made of channel stock, as indicated in Fig. 23, and the rail engaging jaws 60 may be integral, at the lower end of the channel stock. The outstanding brace 72 also may be of channel formation and be integrally or otherwise secured to the upright stake.

The outstanding angle brace 72 may also have rail engaging jaws, as shown at 75 in Fig. 23.

Figs. 20, 21 and 22 show how the rail engaging jaws may be constituted as a separate piece 76 slidingly engaged on the track and having the post 59 and brace 72 rigid therewith swiveled on top of such piece by a rivet 77 or other such connection.

With this last described arrangement the post and the brace may be turned around at various angles with respect to the track to apply the bracing effect to the load in any desired direction. This ability to swivel the brace 72 into different angular relations is of advantage where space is limited and where it may be desired to apply the pressure of the clamp screw 73 from a point at one side of the track instead of directly down on the track.

The skid tracks may be built into the carrier structure as part of the original design, providing desired strength, bracing or the like. If applied later they give additional strength without adding objectionably in weight. In all events they afford rails assisting in the loading and placing of cargo, as well as means for holding the cargo in desired relation.

While of particular importance for aircraft, the system disclosed may be used with advantage in all forms of carriers such as trucks, railway cars, ships and the like, and even for locating, segregating and confining objects in storage or for shipment, in warehouses.

The skid rails with all the various forms of holding devices which can be combined therewith, provide for fastening down, separating, segregating, partitioning and otherwise taking care of practically any kind of load requirements. This, as heretofore shown, includes the handling of passenger as well as commercial loads, or combinations of both. The adjustments provided for include those necessary to hold and maintain the parts firmly and tightly in the selected positions.

The invention provides for handling particularly difficult loads such as loads of steel pipe, loose machine parts and the like. These may be safely carried by setting up the stakes 59 on the tracks 27 to form bins or beds for the pipe or other objects and dropping boards in position across the uprights at the ends of the outlined bins to positively prevent any endwise motion of pipe or other loose objects. For all such problems the tie-down blanket units 40 and adjustable take-up straps 38 may be used in any number and in any relation to best secure the particular load.

The skid tracks and the various fittings used therewith can all be produced at reasonably low cost; they are light in weight and add no objectionable bulk and are practically universal in their adaptability to difficult shipping problems.

Different shapes of slide rings other than those shown may be provided. The wide loop form shown in Fig. 13 may be used for all general purposes since it will take either straps or hooks and when detached from the track may be used to form strap supporting loops, as shown particularly in Fig. 8.

The use of the stakes with stake extensions, as shown in Fig. 5, to provide rigid connections between ceiling and floor or, if desired, across the cargo compartment from one side wall to the other, is desirous for providing barriers or supports for special cargoes, stalls for horses and other such purposes.

In truck constructions such as illustrated in Fig. 18, the load may be held in place by stakes or posts 59 engaged over the rails 27 on the floor of the vehicle. Where these stakes do not extend clear to the top and are not secured to the skid rails, roof or ceiling, they may be steadied as by means of a strap 38 secured across skid rails on the sides of the truck body and carrying loops 80 or other holding elements engaged over the tops of the stakes.

Figures 24, 25, 26, 27:
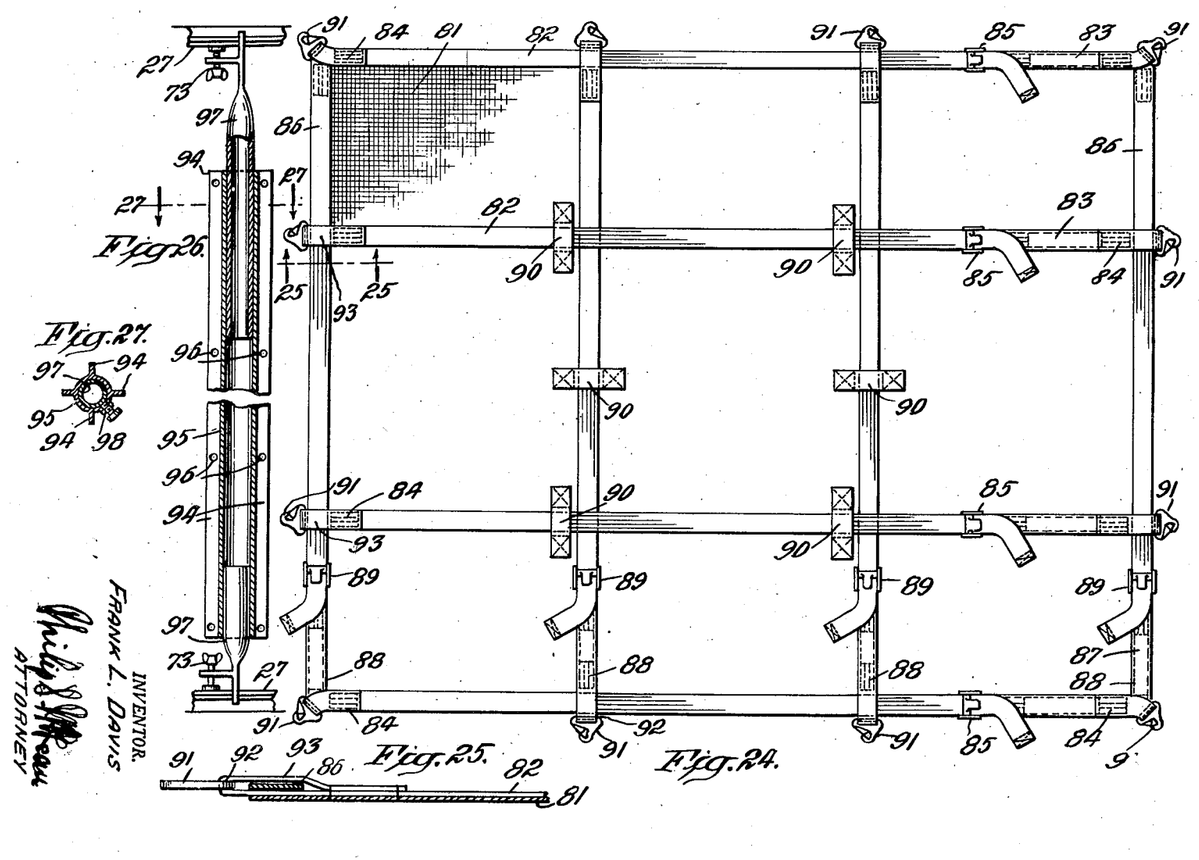
Fig. 24 is a plan view of a form of adjustable take-up blanket for tying down loads of various shapes and sizes.
Fig. 25 is an enlarged broken sectional detail as on substantially the plane of line 25—25 of Fig. 24.
Fig. 26 is a broken sectional view of a form of adjustable length post or stanchion for use with the blankets and tie-down straps for making up bins and enclosures of different size and shape.
Fig. 27 is a transverse sectional view of the post on substantially the plane of line 27—27 of Fig. 26.

Fig. 24 illustrates a two-way or universally contractible form of blanket 81 having longitudinally extending strap sections 82, 83, along the edges and intermediate portions secured at the corners and end edges at 84 and adjustably connected by take-up buckles 85; with corresponding transverse strap sections 86, 87, secured at the corners and side edges at 88 and adjustable as to length by the take-up buckles 89. Intermediate portions of the crossing, longitudinal and transverse straps are shown as slidingly guided through loops 90 appropriately placed on intermediate portions of the blanket.

Snap hooks 91 are shown secured at the ends of all of the straps, providing for attachment of the straps to track engaging rings, wherever available.

Fig. 25 shows how the hooks 91 may be secured by looping the ends of the straps through the strap receiving loops 92 provided on the hooks and how the looped hook securing portions 93 of these straps provide guide loops for the strap sections, in this case 86, extending at right angles thereto. The loops 93 holding the hooks 91 thus serve as guides through which the straps along those edges of the balnket can slide without interfering with collapsing or closing adjustments of the blanket.

Consideration of Figs. 24 and 25 will show that a blanket so constructed can be hooked into place about all four edges over practically any kind of a load, and the straps then be taken up in all four directions to contract the blanket down over that particular shape and bulk of load.

Figure 28:
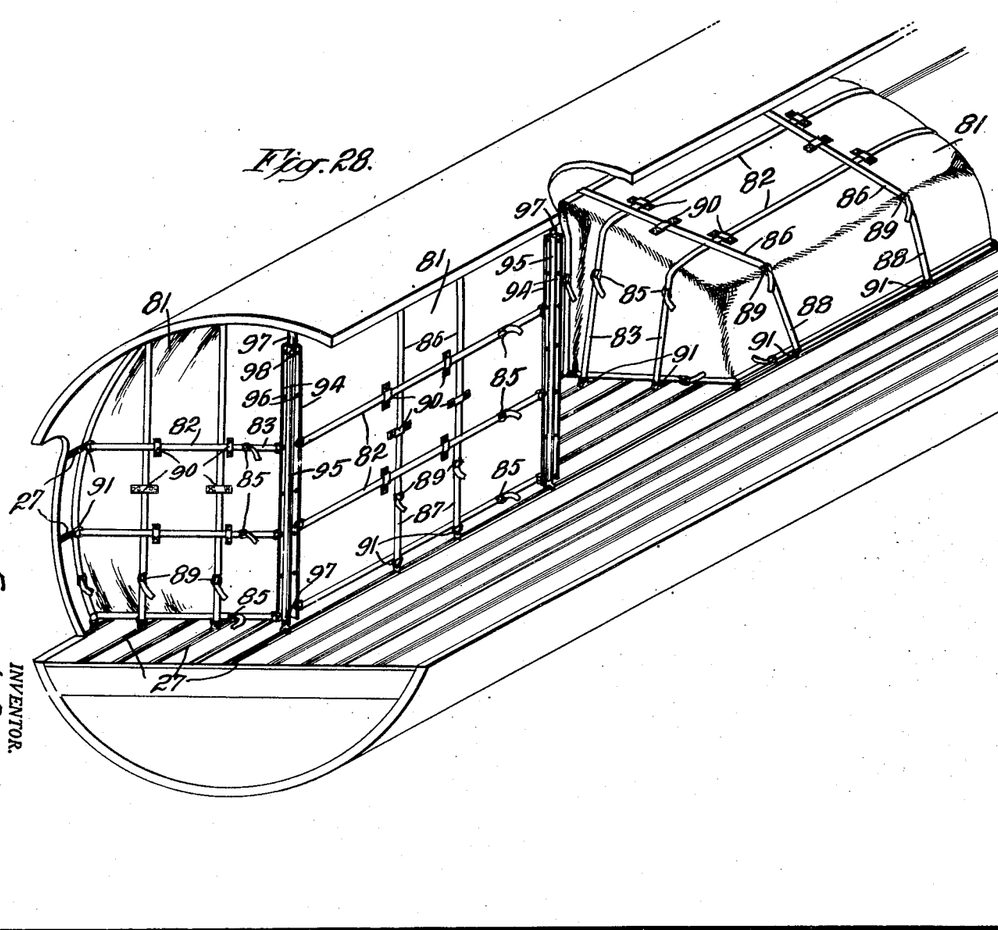
Fig. 28 is a somewhat diagrammatic view illustrating various uses of the stanchion posts and blankets for holding different kinds of loads in a cargo plane.

Fig. 28 illustrates at the right a load of such irregular character covered by one of such blankets which has been connected along its four edges with rings on available skid tracks and then pulled down by the take-up straps into firm holding engagement over the load.

Fig. 28 also shows how these blankets can be used with stanchions or posts to form bins, rooms or enclosures of different shapes and size.

Thus at the left in Fig. 28, two of the universally adjustable blankets 81 are shown, one disposed longitudinally and the other transversely, the longitudinal one hooked to track rings at the top and at the bottom and to edge flanges 94 of posts or stanchions secured between the floor and ceiling of the transport.

Figs. 26 and 27 illustrate details of these stanchions, it being noted, as shown at 95, that they are of tubular construction and that the side flanges 94 have openings 96 to receive the hooks such as 91.

The posts or stanchions 95, like those designated 59 in Fig. 5, may be of adjustable height or length to fit different cargo compartments, or different parts of a compartment of varying height or width.

As particularly shown in Fig. 26, the tubular post has a fixture, 97, at the lower end to hook over a skid rail 27 with a clamp screw 73 at one side to lock it in place. At the top a similar fixture is provided but this is slidingly adjustable in the upper end of the tubular member to facilitate engagement of the fixture with the ceiling rail and to adapt the post to different ceiling heights. If desired, a clamp screw such as shown at 98, Figure 27, may be provided for securing the upper rail engaging fixture 97 in adjusted relation in the post.

While the tubular form of stanchion is desirable because of strength combined with light weight, it is contemplated that these posts or stanchions may be made up of channel, angle, T or other cross sectional shapes, and also that there may be only one or any number of side flanges for hooking the partitioning blankets thereto. These posts may be of light, extruded metal or be built up in various structural shapes such as indicated.

The adjustable stanchions may be secured horizontally across the sides of a cargo aircraft, as well as vertically, in either case serving to strengthen and brace the basic structure. Also, with skid tracks on the sides as well as on the roof and floor, the stanchions may be mounted in various inclined positions, as special conditions may require.

What is claimed is:

1. Apparatus for the purposes disclosed comprising skid tracks for installation on various walls of a carrier and cargo confining means detachably connectible with and slidably adjustable on said skid tracks, said skid tracks having projecting flanges at the sides of the same and said cargo confining means including rings having jaws engageable under said side flanges, said jaws being spaced apart a distance to pass over the tracks but not over said projecting side flanges, and the latter being interrupted at intervals to admit the jaws of said rings over the tracks into engagement with said side flanges.

2. Apparatus for the purposes disclosed comprising skid tracks for installation on various walls of a carrier and cargo confining means detachably connectible with and slidably adjustable on said skid tracks and including a partition and means for conforming the same to the cargo compartment of a carrier.

3. Apparatus for the purposes disclosed comprising skid tracks for installation on various walls of a carrier and cargo confining means detachably connectible with and slidably adjustable on said skid tracks and including a partition and means for conforming the same to the cargo compartment of a carrier, including conforming springs confined in edge portions of said partition for adjustably projecting said edge portions into abutting engagement with the surrounding cargo compartment wall.

4. Apparatus for the purposes disclosed comprising skid tracks for installation on various walls of a carrier and cargo confining means detachably connectible with and slidably adjustable on said skid tracks, including slide rings having a sliding adjustment on said tracks and freedom to rock into inclined relation and binding engagement on the tracks effective to lock said rings in canted relation on said tracks.

5. Apparatus for the purposes disclosed comprising skid tracks of channel cross section for installation in the floor of a carrier with the spaced side edges of the channel formation substantially flush with the floor surface to provide parallel skid rails for cargo to be shifted or supported on said floor, said channel formation tracks having projecting flanges along the sides of the same, rings spanning said tracks and having spaced jaws engaged beneath said flanges, said rings when said jaws are engaged beneath said flanges having clearance at the top of the tracks whereby said rings may be rocked while so engaged with the flanges into binding engagement over the top of the tracks to temporarily secure the rings in selected positions of sliding adjustment along the tracks and cargo confining means attached to said rings.

FRANK L. DAVIS.

REFERENCES CITED

The following references are of record in the file of this patent:

UNITED STATES PATENTS

| Number | Name | Date |
| --- | --- | --- |
| 403,724 | Barber | May 21, 1889 |
| 994,822 | Daly | June 13, 1911 |
| 1,064,130 | Conlin | June 10, 1913 |
| 1,156,540 | Marquis | Oct. 12, 1915 |
| 1,192,231 | Scott | July 25, 1916 |
| 1,745,982 | Copony | Feb. 4, 1930 |
| 1,868,638 | Mackey | July 26, 1932 |
| 2,007,514 | Wilson et al. | July 9, 1935 |
| 2,032,591 | Pride | Mar. 3, 1936 |
| 2,051,381 | Kivlin | Aug. 18, 1936 |
| 2,052,914 | Williams | Sept. 1, 1936 |
| 2,160,870 | Jones | June 6, 1939 |
| 2,165,652 | Reifer et al. | July 11, 1939 |
| 2,391,051 | Windsor | Dec. 18, 1945 |